United States Patent [19]

Oldenburg

[11] 4,057,087
[45] Nov. 8, 1977

[54] CORRUGATED BLADE FOR TREE HARVESTER

[75] Inventor: Dorrance Oldenburg, Yorkville, Ill.

[73] Assignee: Caterpillar Tractor Co., Peoria, Ill.

[21] Appl. No.: 651,492

[22] Filed: Jan. 22, 1976

[51] Int. Cl.$^2$ .......................................... A01G 23/08
[52] Int. Cl. .................... 144/34 E; 30/355;
    30/356; 83/679; 144/309; AC
[58] Field of Search .............. 83/788, 679, 623, 600,
    83/918; 30/355, 356, 178, 186, 187, 188, 189,
    190, 191, 192, 193; 144/3 D, 34 R, 34 E, 34 F,
    309 AC

[56] References Cited
U.S. PATENT DOCUMENTS

| 397,692 | 2/1889 | Clark | 30/355 |
|---|---|---|---|
| 676,781 | 6/1901 | Stimpson | 30/355 X |
| 1,146,610 | 7/1915 | Altman | 30/178 |
| 3,270,787 | 9/1966 | Rehnstrom | 144/34 E |
| 3,837,382 | 9/1974 | Gaither | 144/34 E |
| 3,918,476 | 11/1975 | Jasinski | 83/600 X |

*Primary Examiner*—Willie G. Abercrombie
*Assistant Examiner*—W. D. Bray
*Attorney, Agent, or Firm*—Phillips, Moore, Weissenberger, Lempio & Majestic

[57] ABSTRACT

An apparatus includes a pair of corrugated blades, each defining parallel elongated ridges running from the cutting edges thereof substantially the full length thereof. The apparatus may be positioned so that the cutting edges of the blades may be brought into contact with a tree on either side of the tree.

6 Claims, 5 Drawing Figures

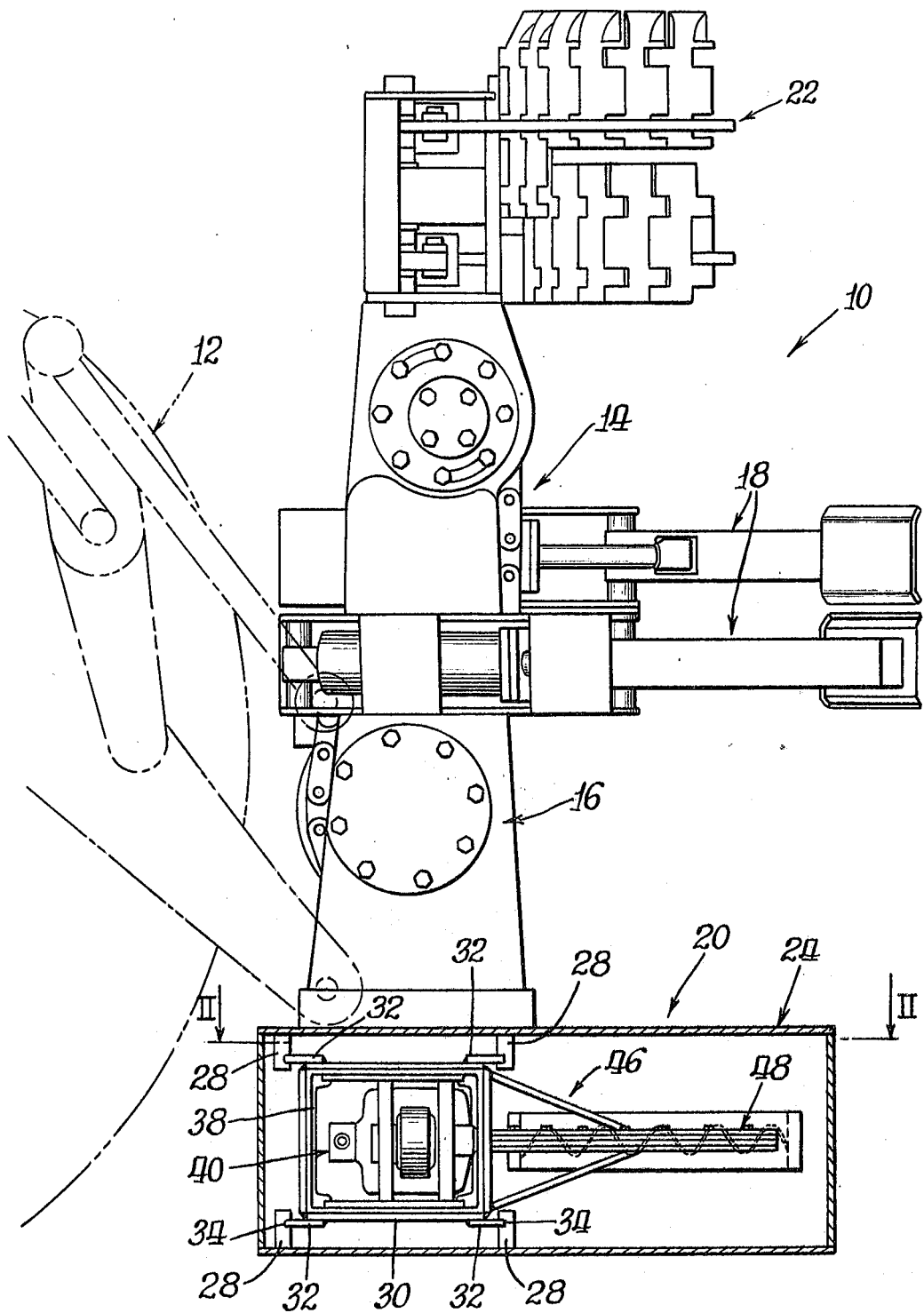
Fig_1_

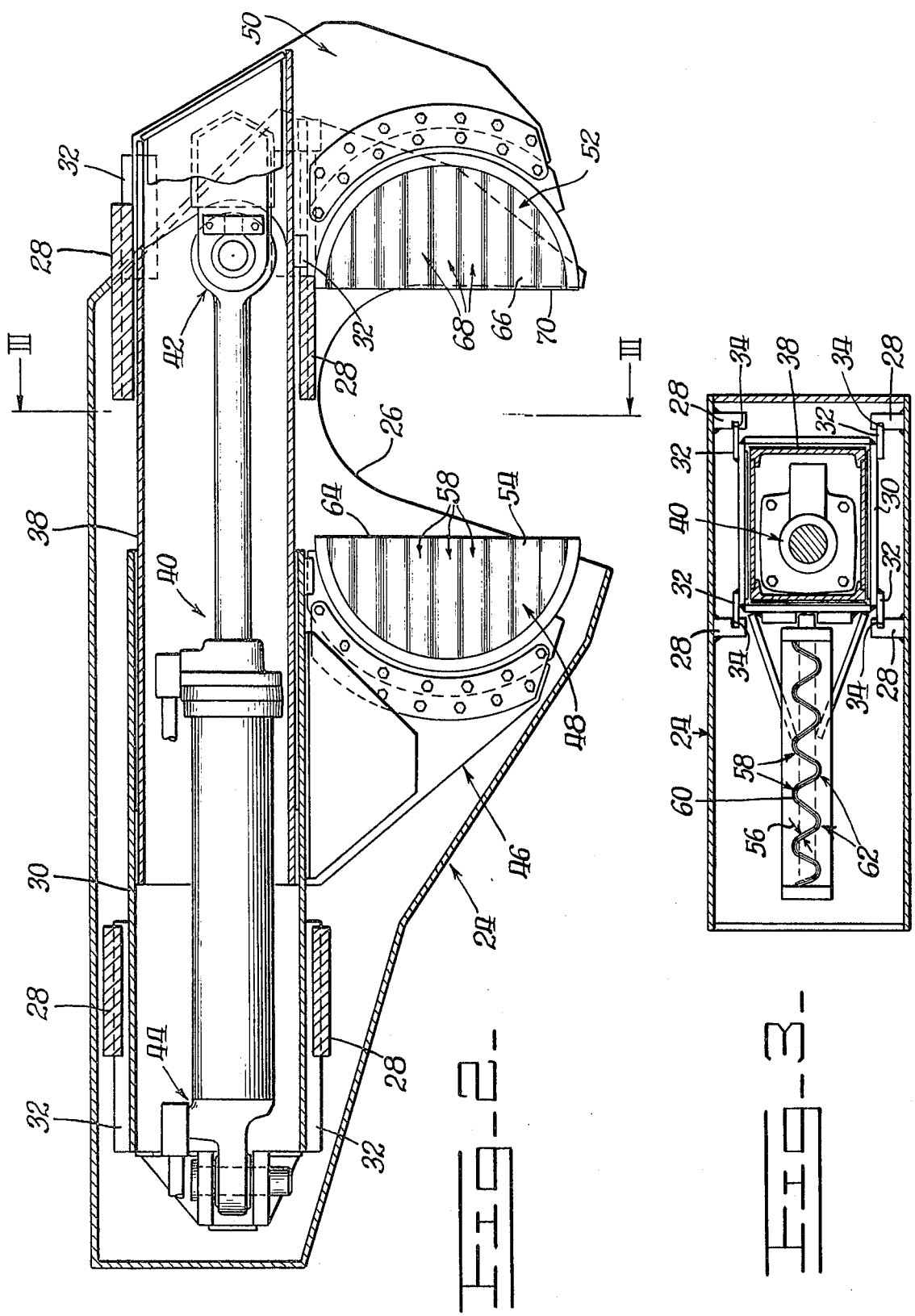

CORRUGATED BLADE FOR TREE HARVESTER

BACKGROUND OF THE INVENTION

This invention relates to apparatus for felling standing trees, and more particularly, to an improved tree cutting assembly for use in such apparatus.

Devices which include blades for cutting standing trees embodying a blade or blades brought into contact with a tree have become relatively widespread in use. Such an apparatus is highly efficient as a replacement for, for example, chain saws because of much faster operation lending itself to automation.

A major problem involved in such previous apparatuses is the high degree of splitting damage to a tree caused thereby, particularly in very cold weather. Such problem must be considered along with the problem of providing a cutting blade or blades strong enough to provide that proper cutting of the tree does indeed take place.

U.S. Pat. No. 3,631,906 to Forslund, U.S. Pat. No. 3,690,353 to Johnston et al, and U.S. Pat. No. 3,837,382 to Gaitten each describe systems generally along the above line. That is, a blade or blades are shown therein to be brought into contact with a tree upon application of force to the blade or blades to cut the tree. While such systems are relatively efficient in operation, it will be understood that the above-described problem is the type which lends itself to solutions designed to increase the overall cutting efficiency, i.e., less splitting damage at even lower ambient temperatures.

SUMMARY OF THE INVENTION

It is accordingly, an object of this invention to provide a blade for cutting a tree by applying force to the blade, wherein such blade is of extremely high strength so as to be properly capable of making such a cut, meanwhile providing that minimal splitting damage is done to the tree.

It is a further object of this invention to provide an apparatus which incorporates cutting blades, wherein such apparatus is extremely simple in operation and convenient for use.

Broadly stated, the invention comprises a cutting blade for cutting a tree by applying force to the blade comprising a cutting blade body of generally flat, overall configuration defining a cutting edge, the cutting blade body defining a plurality of generally parallel, elongated ridges, the tops of which are each rounded in cross-section, the depressions therebetween each being rounded in cross-section. The ridges run substantially the full length of the cutting blade body from the cutting edge thereof, to define a cutting edge the shape of which is determined by the ridges.

BRIEF DESCRIPTION OF THE DRAWINGS

These and other objects of the invention will become apparent from a study of the following specifications and drawings, in which:

FIG. 1 is a side elevation of a tree-harvesting machine embodying the invention;

FIG. 2 is a sectional view taken along the line II—II of FIG. 1;

FIG. 3 is a sectional view taken along the lines III—III of FIG. 2;

DESCRIPTION OF THE PREFERRED EMBODIMENTS

Figure 4:
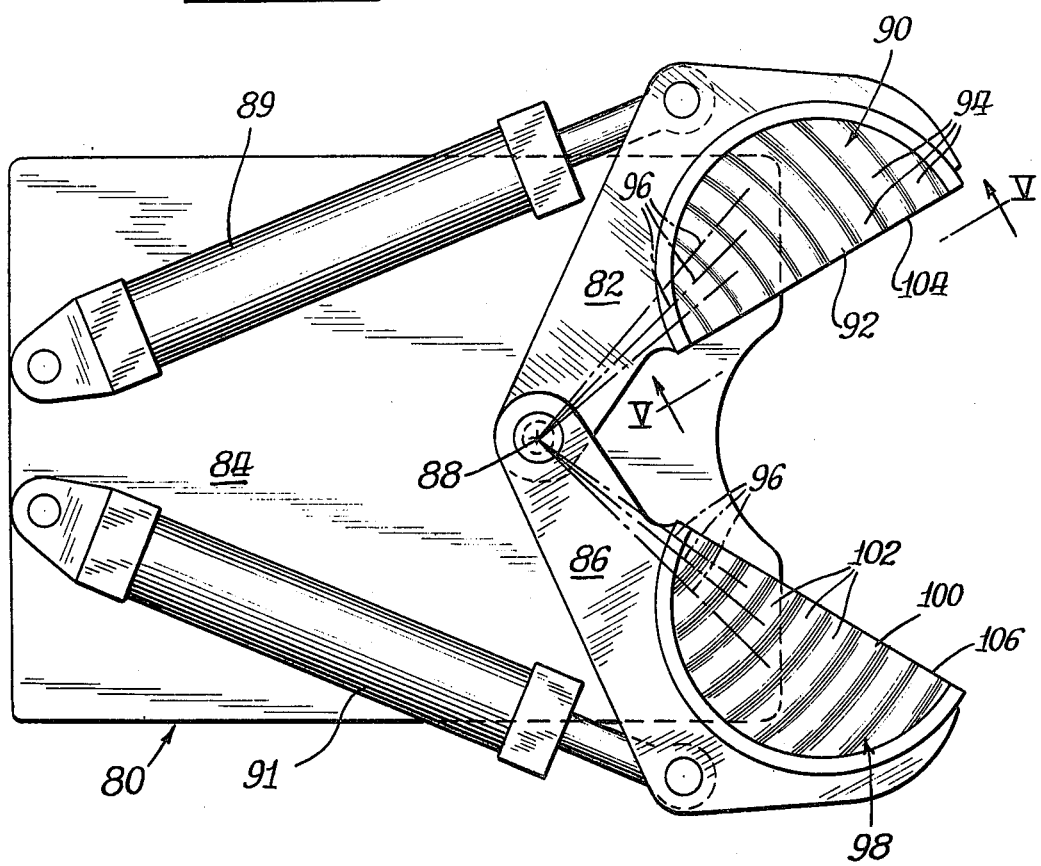
FIG. 4 is a plan view of a second embodiment of cutting apparatus embodying the invention.

Shown in FIG. 1 is a tree harvester 10 mounted to a vehicle by means of a linkage 12, as is well known. A drive mechanism 14 is arranged upon a midportion of the frame 16 of the tree harvester 10, with grapple arms 18 being pivotably supported upon the frame 16, and operable for urging a tree into engagement with the drive mechanism 14. The subject shear or cutting mechanism 20 is mounted upon the lower end of the frame 16 and includes means for severing or cutting trees which are properly arranged within the harvester 10, as will further be described.

A delimber assembly 22 is mounted upon the upper end of the frame 16 as viewed in FIG. 1.

The shear mechanism 20 includes a casing 24 fixed to the lower portion of the frame 16 and defining a generally U-shaped slot 26 within which the trunk of the tree may be positioned by appropriate positioning of the vehicle and harvester 10. The casing 24 has fixed inwardly thereof lugs 28 (see also FIGS. 2 and 3). An elongated tubular member 30 of square cross-section is positioned within the casing 24 and has elongated flanges 32 fixed to the outer surface thereof, the flanges 32 being disposed in respective grooves 34 defined by the lugs 28. The grooves 34 are positioned longitudinally of the elongated member 30, to allow sliding movement of the elongated member 30 along its length relative to the casing 24.

Slidably disposed within the elongated member 30 is yet another tubular elongated member 38 of rectangular cross-section. Such member 38 may be moved along its length relative to and within the tubular elongated member 30.

A hydraulic cylinder 40 has its rod end 42 mounted to the tubular member 38 and its head end 44 mounted to the tubular member 30. The hydraulic cylinder 40 is double-acting, and it will be seen that extension of the cylinder 40 moves the members 30, 38 relatively apart, and retraction of the cylinder 40 moves the members 30, 38 relatively together, in a telescoping manner.

The tubular member 30 has fixed to the outer surface thereof a support assembly 46 to which is bolted a blade 48. The tubular member 38 likewise has fixed thereto a support assembly 50 to which is bolted a blade 52. The blade 48 includes a cutting blade body 54 which is corrugated, but which is generally flat in overall configuration, i.e., such blade body 54 does not define a general overall curve along its width or length.

The corrugated cutting blade body 54 is of substantially uniform thickness throughout, i.e., the thickness shown at 56 is substantially constant throughout the cutting blade body 54. The corrugated cutting blade body 54 as such defines a plurality of parallel elongated ridges 58, the tops 60 of which are each rounded in cross-section, the depressions 62 therebetween each being rounded in cross-section, as shown in FIGS. 1 and 3. The ridges 58 run substantially the full length of the cutting blade body 54 from the cutting edge 64 thereof, to define a cutting edge 64 the shape of which is determined by the ridges 58, i.e., the cutting edge 4 is generally wave-shaped, as would be a cross-section of the blade taken parallel to the cutting edge.

In the embodiment of FIGS. 1-3, the ridges 58 are substantially straight in configuration, and run from the cutting edge 64 perpendicular thereto.

The blade 52 likewise includes a cutting blade body 66 of generally flat overall configuration, i.e., containing no general curves along its width or length, but with such cutting blade body 66 again being corrugated in configuration, defining a plurality of straight, parallel elongated ridges 68, the tops of which are each rounded in cross-section, and the depressions therebetween each being rounded in cross-section.

The ridges 68 of such cutting blade body 66 run the full length of the cutting blade body 66 from the cutting edge 70 thereof, to define a cutting edge 70 of the blade body 66 the shape of which is determined by the ridges 68, all similar to the cutting blade body 54 described above. The cutting blade body 66 is again of substantially uniform thickness throughout, similar to the cutting blade body 54 described above.

In the use of the apparatus, the vehicle and harvester 10 are positioned so that the tree is disposed in the slot 26, with, of course, the cylinder 40 fully extended to move the blades 48, 52 to the positions shown in FIG. 2. The grapple arms 18 are actuated to grip a portion of the tree therebetween. The cylinder 40 is then retracted by the operator of the vehicle, to bring the cutting edges 64, 70 into contact with the tree so that further force applied by the cylinder 40 to the blades 48, 52 cuts the tree. The blade bodies 54, 66 are positioned so that the ridges 58, 68 run along the lines of movement of such blades 48, 52, determined by the movement of the cylinder 40 and the relative movement of the tubular members 30, 38. Such positioning insures that a proper, smooth cut will take place.

Further retraction of the cylinder 40 brings the cutting edges 64, 70 adjacent each other, and it is to be noted that the ridges 58, 68 of the cutting blade bodies 54, 66 are configured so that each ridge 58 of the cutting blade body 54 aligns with a corresponding ridge 68 of the cutting blade body 66. Thus, the corrugations tend to "match up" to insure that upon full closing of the blades 48, 52, a full and continuous cut has been made through the trunk of the tree.

After such operation, the cylinder 40 is extended to withdraw the blades 48, 52 from the tree, and the further delimbing operation may then take place, it being remembered that at this point, the cut tree is still being held by the grapple arms 18.

Figure 5:
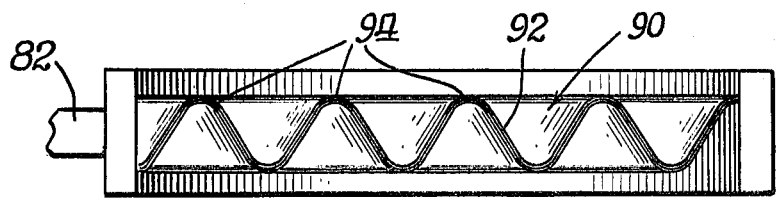
FIG. 5 is a view taken along the line V—V of FIG. 4.

Shown in FIGS. 4 and 5 is another embodiment of tree-cutting apparatus 80. In such apparatus 80, a first member 82 is pivotably mounted to a frame 84 which is in turn mounted to the linkage 12 in FIG. 1. The gripping apparatus 18 and delimbing apparatus 22 of FIG. 1 may, of course, also be included. Another member 86 is pivotably mounted to the frame 84, the first and second members 82, 86 being mounted so as to pivot relative to each other about a common axis 88. Cylinders 89, 91 interconnect the frame 84 and members 82, 86 respectively as shown.

The member 82 has mounted thereto a blade 90 so as to be movable therewith, the blade 90 including a corrugated cutting blade body 92, but with the parallel ridges 94 being curved along respective arcs determined by rotating respective radii 96 about and extending from the axis 88. The member 86 likewise has a blade 98 mounted thereto including a corrugated cutting blade body 100, with the parallel ridges 102 thereof likewise being curved along respective arcs determined by rotating respective radii 96 about and extending the axis 88. The cutting blade bodies 92, 100 are also of substantially uniform thickness throughout similar to the cutting blade bodies described in the previous embodiment. In fact, the cutting blade bodies 92, 100 are substantially the same as the cutting bodies described above, with the ridges thereof running the full lengths of the respective cutting blade bodies 92, 100, with the only changes being that the ridges 94, 102 in the embodiment of FIGS. 4 and 5 are curved in accordance with the above discussion, rather than straight as in the embodiment shown in FIGS. 1–3.

In the use of the apparatus 80 as shown in FIGS. 4 and 5, the vehicle is moved to position the tree trunk between the blades 90, 98, with the cylinders 89, 91 retracted to define an open position of the blades 90, 98. Upon such proper positioning, the cylinders 89, 91 are extended by the operator of the vehicle, to bring the edges 104, 106 of the cutting blade bodies 92, 100 into contact with the tree, whereupon further extension of the cylinders 89, 91 provides cutting of the tree. Similar to the above embodiment, during the cutting of such tree, the cutting edges 104, 106 of the cutting blade bodies 92, 100 are brought adjacent each other, and it is to be noted that each ridge 94 defined by the cutting blade body 92 aligns with a corresponding ridge 102 defined by the cutting blade body 100, with the aligned ridges being curved along a single arc determined by rotating a radius 96 about the axis 88. Through such particular structure, it is insured that a full transverse cut of the tree is achieved.

It should be understood that the corrugations of the blades can take a variety of shapes without lessening effectiveness of operation of the blades. For example, the corrugations could be in the form of a series of V-shapes in cross-section.

It should be noted that the cutting blade bodies of either embodiment can be relatively easily manufactured as, for example, by the stamping of a sheet of metal of substantially uniform thickness. The providing of ridges in each embodiment, i.e., the corrugation thereof, provides that the blade bodies are extremely strong for their weight, particularly along the lines which the blades are moved during the actual cutting taking place. That is, it will be seen that such ridges in either embodiment are aligned with the direction of movement of the blades to provide strength in the cutting direction needed. That is, the ridges increase the section modulus or beam strength of the blades as compared to a flat blade of equal thickness. The particular inclusion and placement of the ridges results in a minimum of deflection of the blade during cutting, and aids in the ability of the blade to resist vertical forces which can be placed on the blade by, for example, lifting or tilting of the harvester head with shearing. Because of the strengthening provided by the ridges, running the full length of each cutting blade body, extremely strong yet light cutting blades are provided. Such cutting blades have been found highly effective in minimizing splitting damage of a tree during the cutting thereof, even in very low temperatures.

I claim:
1. Apparatus for cutting a tree comprising:
   a first member;
   a second member operatively coupled with the first member so that the first and second members are relatively movable;
   a first blade mounted to the first member and comprising a first cutting blade body defining a cutting edge, said first cutting blade body defining a plurality of generally parallel elongated ridges, the tops of which are rounded in cross-section, the depressions therebetween each being rounded in cross-section, said ridges running substantially the entire length of the first cutting blade body from the cutting edge thereof, each ridge of the first cutting blade body being substantially uniform in width along its full length, said ridges running to the cutting edge to define a cutting edge the shape of which is determined by said ridges;

a second blade mounted to the second member and comprising a second cutting blade body defining a cutting edge, said second cutting blade body defining a plurality of generally parallel elongated ridges, the tops of which are rounded in cross-section, the depressions therebetween each being rounded in cross-section, said ridges running substantially the entire length of the second cutting blade body from the cutting edge thereof, each ridge of the second cutting blade body being substantially uniform in width along its full length, said ridges running to the cutting edge to define a cutting edge the shape of which is determined by said ridges;

the apparatus being positionable so that a tree may be disposed between the first and second blades; and, means for selectively relatively moving the first and second members to bring the blades into contact with a tree positioned therebetween to cut such relatively positioned tree.

2. The apparatus of claim 1 wherein the first cutting blade body is of substantially uniform thickness, and wherein the second cutting blade body is of substantially uniform thickness.

3. The apparatus of claim 2 wherein the ridges defined by the first cutting blade body are substantially straight in configuration, and run along the line of movement of such blade into a tree, and wherein the ridges defined by the second cutting blade body are substantially straight in configuration, and run along the line of movement of such blade into a tree, determined by relative movement of the first and second members.

4. The apparatus of claim 3 wherein, with the cutting edges of the first and second cutting blade bodies adjacent each other, the ridges of the first and second cutting blade bodies are configured so that each ridge defined by the first cutting blade body aligns with a corresponding ridge defined by the second cutting blade body.

5. The apparatus of claim 1 wherein the first and second members are pivotally mounted so as to pivot relative to each other about a common axis, and wherein the ridges of the first cutting blade body are curved along respective arcs determined by rotating respective radii about said common axis, and wherein the ridges of the second cutting blade body are curved along respective arcs determined by rotating respective radii about said common axis.

6. The apparatus of claim 5 wherein, with the cutting edges of the first and second cutting blade bodies adjacent each other, each ridge defined by the first cutting blade body aligns with a corresponding ridge defined by the second cutting blade body so that said aligned ridges are curved along a single arc determined by rotating a radius about said common axis.

* * * * *